No. 854,686. PATENTED MAY 21, 1907.
H. BORNEMAN.
JAR HOLDER.
APPLICATION FILED FEB. 27, 1906.
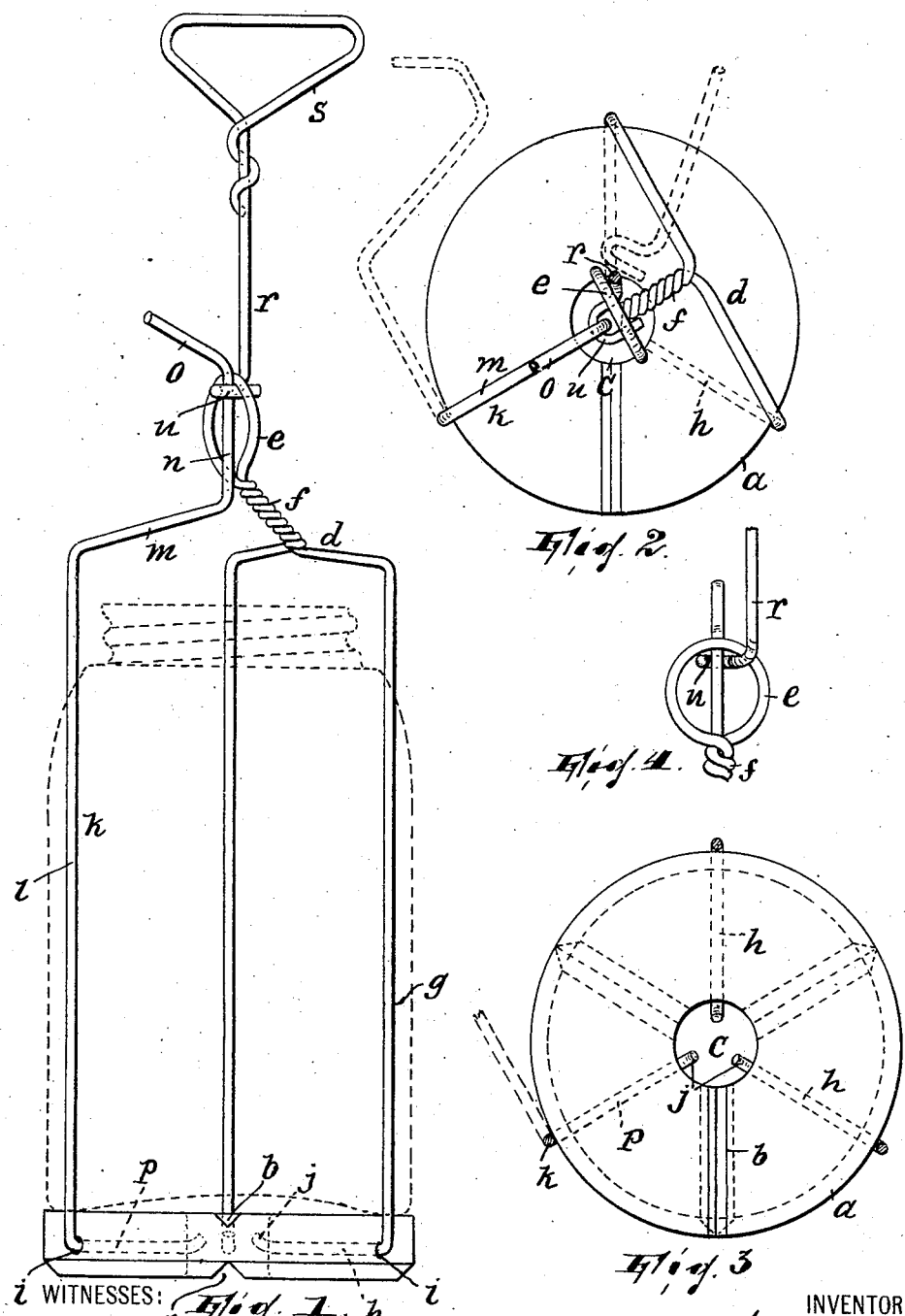
INVENTOR,
Henry Borneman,

UNITED STATES PATENT OFFICE.

HENRY BORNEMAN, OF PATERSON, NEW JERSEY, ASSIGNOR TO ANDREW G. BORNEMAN, OF ATHENIA, NEW JERSEY.

JAR-HOLDER.

No. 854,686.   Specification of Letters Patent.   Patented May 21, 1907.

Application filed February 27, 1906. Serial No. 303,158.

*To all whom it may concern:*

Be it known that I, HENRY BORNEMAN, a citizen of the United States, residing in Paterson, county of Passaic, State of New Jersey, have invented certain new and useful Improvements in Jar-Holders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention is an improvement in devices for handling jars and the like in preserving, whereby to avoid burning the hands, dropping the jars, and similar accidents and inconveniences. I contemplate providing a device of this nature which shall be simple in construction and reliable in operation and which can be manufactured and sold for a comparatively small amount.

My invention consists in a suitable base, preferably of wood or the like, and vertical wires or substantially similar devices which form with the base a cage for the jars and one of which is movable out of its normal position for the purpose of admitting the jars to and removing them from the cage.

My invention will be found fully illustrated in the accompanying drawings, wherein, Figure 1 is a side view of my improved jar holder, showing the jar in dotted outline; Fig. 2 is a top plan view of the jar holder; Fig. 3 is a sectional view taken just above the base in Fig. 1; and, Fig. 4 is a detail view showing the manner of interlocking the jar holder and an implement for lifting the same, while keeping its parts in the closed position.

In said drawings, $a$ is a base preferably formed of wood or some such material; the jar seats on this base, as shown in the drawings, and being of wood or the like the base prevents the heat from the bottom of the kettle in which the holder, containing the jar, is placed, from cracking the bottom of the jar. The base may have radial grooves $b$ on its top and bottom surfaces and a central hole $c$ affording escape for bubbles of steam that form thereunder and under the jar and make the holder rest unsteadily in the kettle and the jar in the holder.

$d$ is a wire twisted to form a loop or eye $e$, a neck $f$ and two downwardly depending legs or vertical portions $g$ having their lower ends turned in at right angles, as at $h$, and extended into holes $i$ formed radially in the base; to prevent the inturned portions $g$ from slipping out of the holes, their extremities are slightly bent off, as at $j$.

$k$ is a third wire having a substantially straight vertical portion $l$, its upper end portion bent first inwardly, as at $m$, then vertically, as at $n$, and then outwardly, as at $o$, and having its lower end portion bent inwardly at right angles, as at $p$, and extending into one of the holes $i$ in the base and having its free end bent off slightly, as at $j$, to prevent its slipping out of the hole. The wire $k$ is arranged to turn on its portion $p$ as a pivot (see Figs. 2 and 3) so as to permit the jar to be admitted to or removed from the holder.

$r$ is an implement, used in connection with the holder, for conveying the holder, containing a jar, from one place to another, as into and out of the kettle. It preferably consists of a heavy piece of wire formed with a handle or loop $s$ at one end and with a hook $u$ at the other, the latter being arranged in a plane at right angles to the body portion or shank of the implement, whereby, when inserted through the loop $e$, the wire $k$ having been previously arranged opposite said loop, the hook $u$ may be passed around the portion $n$ of wire $k$ and so hold wire $k$ in the closed position while the holder is being lifted.

Having thus fully described my invention, what I claim as new and desire to secure by Letters Patent is:

1. The combination of a base, several spaced vertical members having their lower end portions extending radially into said base and forming therewith a cage, one of said vertical members being movable in said base on its lower end portion as a pivot out of its normal position for admitting or removing the jar and others being fixed together, and a carrying implement adapted to engage said pivoted member to hold the same in its normal position, substantially as described.

2. The combination of a base, a wire bent to form a loop at its upper end and two downwardly extending members attached to the base, another wire pivoted in the base and extending upwardly therefrom, and a carrying implement comprising a hook adapted to be introduced through said loop and engaged with the pivoted member, substantially as described.

In testimony, that I claim the foregoing, I have hereunto set my hand this 17th day of February, 1906.

HENRY BORNEMAN.

Witnesses:
  JOHN W. STEWARD,
  WM. D. BELL.